United States Patent
Kusuda et al.

(10) Patent No.: US 9,869,276 B2
(45) Date of Patent: Jan. 16, 2018

(54) ENGINE DUCT AND AIRCRAFT ENGINE

(71) Applicant: IHI Corporation, Koto-ku (JP)

(72) Inventors: Shinya Kusuda, Tokyo (JP); Yoshinori Ooba, Tokyo (JP)

(73) Assignee: IHI Corporation, Koto-ku (JP)

( * ) Notice: Subject to any disclaimer, the term of this patent is extended or adjusted under 35 U.S.C. 154(b) by 373 days.

(21) Appl. No.: 14/601,885

(22) Filed: Jan. 21, 2015

(65) Prior Publication Data
US 2015/0128562 A1  May 14, 2015

Related U.S. Application Data

(63) Continuation of application No. PCT/JP2013/070171, filed on Jul. 25, 2013.

(30) Foreign Application Priority Data

Jul. 26, 2012  (JP) .................................. 2012-165652

(51) Int. Cl.
*F02K 3/06*  (2006.01)
*F01D 5/14*  (2006.01)
(Continued)

(52) U.S. Cl.
CPC ............... *F02K 3/06* (2013.01); *F01D 5/143* (2013.01); *F01D 5/145* (2013.01); *F01D 9/041* (2013.01);
(Continued)

(58) Field of Classification Search
CPC . F02K 3/06; F01D 5/143; F01D 5/145; F01D 9/041; F01D 25/162; F04D 29/545; F05D 2240/12; Y02T 50/673
(Continued)

(56) References Cited

U.S. PATENT DOCUMENTS 2,735,612 A    2/1956  Hausmann
3,540,682 A *  11/1970 Ferguson ............... F01D 5/022
                                        244/53 R
(Continued)

FOREIGN PATENT DOCUMENTS

CN    1657756 A    8/2005
CN    1975130 B    7/2011
(Continued)

OTHER PUBLICATIONS

Extended European Search Report dated Jun. 22, 2016 in Patent Application No. 13822491.0.
(Continued)

*Primary Examiner* — Phutthiwat Wongwian
*Assistant Examiner* — Jessica Kebea
(74) *Attorney, Agent, or Firm* — Oblon, McClelland, Maier & Neustadt, L.L.P.

(57) ABSTRACT

A projecting part is formed on an inner circumferential wall surface of a nacelle so that the projecting part projects inward in a diametral direction and extends from a front edge of each of circumferentially-oriented side faces of a bottom pylon. The shape of the projecting part seen from an inner side of the diametral direction is a streamline shape extending in parallel with an engine shaft direction. An apex part at the center of the projecting part is positioned on a rear edge of the bottom pylon.

4 Claims, 6 Drawing Sheets

(51) Int. Cl.
*F01D 9/04* (2006.01)
*F01D 25/16* (2006.01)
*F04D 29/54* (2006.01)

(52) U.S. Cl.
CPC ......... *F01D 25/162* (2013.01); *F04D 29/545* (2013.01); *F05D 2240/12* (2013.01); *Y02T 50/673* (2013.01)

(58) Field of Classification Search
USPC .................................. 60/226.1, 226.2, 226.3
See application file for complete search history.

(56) References Cited

U.S. PATENT DOCUMENTS

| | | | | |
|---|---|---|---|---|
| 3,617,147 | A | 11/1971 | Bragg | |
| 4,044,973 | A * | 8/1977 | Moorehead | B64D 27/26 244/54 |
| 5,369,954 | A * | 12/1994 | Stuart | B64D 29/00 239/265.17 |
| 5,848,526 | A | 12/1998 | Hanson | |
| 6,669,445 | B2 | 12/2003 | Staubach et al. | |
| 7,673,458 | B2 * | 3/2010 | Kemper | F02K 1/08 239/265.19 |
| 8,105,037 | B2 * | 1/2012 | Grover | F01D 5/143 416/179 |
| 8,177,499 | B2 * | 5/2012 | Iida | F01D 5/143 415/208.1 |
| 8,206,115 | B2 * | 6/2012 | Gupta | F01D 5/143 415/211.2 |
| 8,356,975 | B2 * | 1/2013 | Grover | F01D 9/02 415/191 |
| 8,444,378 | B2 * | 5/2013 | Clemen | F02K 3/06 415/144 |
| 8,727,716 | B2 * | 5/2014 | Clements | F01D 9/02 415/191 |
| 8,794,912 | B2 * | 8/2014 | Nilsson | F01D 9/04 415/191 |
| 8,870,530 | B2 * | 10/2014 | Morvant | B64D 33/06 415/144 |
| 9,017,030 | B2 * | 4/2015 | Beeck | F01D 5/141 416/193 A |
| 9,181,899 | B2 * | 11/2015 | Dindar | B64D 33/04 |
| 9,359,904 | B2 * | 6/2016 | Pernleitner | F01D 5/225 |
| 2003/0170124 | A1 | 9/2003 | Staubach et al. | |
| 2007/0258810 | A1 | 11/2007 | Aotsuka et al. | |
| 2009/0196739 | A1 | 8/2009 | Tsuchiya | |
| 2010/0232954 | A1 | 9/2010 | Clemen | |
| 2010/0254797 | A1 | 10/2010 | Grover et al. | |
| 2011/0262277 | A1 * | 10/2011 | Sjoqvist | F01D 9/041 416/213 R |

FOREIGN PATENT DOCUMENTS

| | | |
|---|---|---|
| EP | 1 936 120 A2 | 6/2008 |
| EP | 2 022 965 A1 | 2/2009 |
| JP | 05-202768 A | 8/1993 |
| JP | 10-306732 A | 11/1998 |
| JP | 2000-087803 A | 3/2000 |
| JP | 2003-172206 A | 6/2003 |
| JP | 2003-269384 A | 9/2003 |
| JP | 2007-321617 A | 12/2007 |
| JP | 4061635 B2 | 3/2008 |
| JP | 2008-151033 A | 7/2008 |
| JP | 2010-150954 A | 7/2010 |
| JP | 2011-21525 A | 2/2011 |
| JP | 2011-112001 A | 6/2011 |
| JP | 2012-145001 A | 8/2012 |
| SU | 1469187 A1 | 3/1989 |
| WO | WO 2006/033407 A1 | 3/2006 |
| WO | WO 2008120748 A1 * | 10/2008 ............. F01D 5/143 |

OTHER PUBLICATIONS

Office Action dated Aug. 2, 2016 in Russian Patent Application No. 2015105965/06(009601).
Office Action dated Mar. 11, 2016 in Russian Patent Application No. 2015105965/06(009601).
International Search Report dated Aug. 27, 2013 for PCT/JP2013/070171 filed Jul. 25, 2013 with English Translation.
International Written Opinion dated Aug. 27, 2013 for PCT/JP2013/070171 filed Jul. 25, 2013.
Combined Chinese Office Action and Search Report dated Nov. 23, 2015 in Patent Application No. 201380038301.7 (with English language translation).

* cited by examiner

ENGINE DUCT AND AIRCRAFT ENGINE

CROSS REFERENCE TO RELATED APPLICATION

This application is a Continuation of PCT Application No. PCT/JP2013/070171, filed on Jul. 25, 2013 and claims the benefit of priority under 35 U.S.C. 119(a) to Japanese Patent Application No. 2012-165652 filed on Jul. 26, 2012 the entire contents of which are incorporated by reference herein.

TECHNICAL FIELD

The present invention relates to an engine duct that takes in air and discharges a core jet and bypass jet, as well as to an aircraft engine that discharges a core jet and bypass jet to generate an engine thrust.

BACKGROUND ART

In recent years, various developments have been made for an engine duct that is an essential structural element of an aircraft engine. A conventional engine duct according to a related art will briefly be explained in connection with its structure and the like.

The conventional engine duct has a cylindrical core cowl (an engine inner cylinder). Formed inside (on the inner side of) the core cowl is an annular core passage that takes in air and discharges a core jet. Arranged outside the core cowl is a cylindrical nacelle (engine outer cylinder) that surrounds the core cowl. Formed between an inner circumferential wall surface of the nacelle and an outer circumferential wall surface of the core cowl is an annular bypass passage that takes in air and discharges a bypass jet. In addition, arranged between the outer circumferential wall surface of the core cowl and the inner circumferential wall surface of the nacelle are a plurality of struts that are arranged at intervals in a circumferential direction to serve as structural members to support the nacelle with respect to the core cowl.

From an upper part of the core cowl to an upper part of the nacelle, a top pylon is integrally connected to serve as a main pylon that extends in parallel with an engine shaft direction of the aircraft engine. The top pylon projects upward (toward an outer side of a diametral direction) from the nacelle and is used to attach the aircraft engine to the aircraft and to transmit an engine thrust thereto. Set between a lower part of the outer circumferential wall surface of the core cowl and a lower part of the inner circumferential wall surface of the nacelle is a bottom pylon serving as a sub-pylon, the bottom pylon and top pylon being symmetrically set with respect to an engine shaft center. The bottom pylon is positioned between the struts that are adjacent to each other in the circumferential direction and has a function of serving as a structural member to support the nacelle with respect to the core cowl, and in addition, a function of accommodating piping and the like. Arranged between the outer circumferential wall surface of the core cowl and the inner circumferential wall surface of the nacelle upstream from the struts are a plurality of fan outlet guide vanes that are arranged at intervals in the circumferential direction to rectify the air taken into the bypass passage into an axial flow.

When the aircraft engine is started, air taken into the core passage is discharged as a core jet and air taken into the bypass passage is rectified into an axial flow and discharged as a bypass jet. This results in generating an engine thrust of the aircraft engine.

Related arts concerning the present invention include Japanese Unexamined Patent Application Publication No. 2008-151033 (Patent Literature 1) and Japanese Unexamined Patent Application Publication No. H05-202768 (Patent Literature 2).

SUMMARY OF INVENTION

Problems to be Solved by Invention

A three-dimensional unsteady viscous CFD (Computational Fluid Dynamics) analysis conducted on a flow field in the bypass passage during operation of the aircraft engine has clarified that, as illustrated in FIG. 6A, a large separation area is created around a connection part of the inner circumferential wall surface of the nacelle and the bottom pylon. FIG. 6A is a view illustrating the separation area in the flow field in the bypass passage of the engine duct according to the related art. If the separation area increases in the flow field in the bypass passage during operation of the aircraft engine, a thrust loss in the bypass passage will increase accordingly to hardly improve the engine performance of the aircraft engine to higher levels.

In the flow field in the bypass passage during operation of the aircraft engine, large separation areas are spontaneously created not only around the connection part of the inner circumferential wall surface of the nacelle and the bottom pylon but also around a connection part of the outer circumferential wall surface of the core cowl and the bottom pylon, connection parts of the inner circumferential wall surface of the nacelle and the struts, and the like. If such occur, problems similar to the above-mentioned problem will arise.

The present invention is capable of providing an aircraft engine that reduces a separation area in a flow field in a bypass passage, decreases a thrust loss, and realizes high efficiency.

Means to Solve Problems

The inventors of the present invention have repeated one trial and error after another to solve the above-mentioned problems and obtained novel knowledge that, as illustrated in FIGS. 5A, 5B, and 6B, forming a predetermined projecting part on the inner circumferential wall surface of the nacelle so that the projecting part projects inward in a diametral direction and extends from each circumferentially-oriented side face (from a front edge of each circumferentially-oriented side face) of the bottom pylon serving as the sub-pylon toward a downstream side results in sufficiently reducing a separation area around the connection part of the inner circumferential wall surface of the nacelle and the bottom pylon in a flow field in the bypass passage during operation of the aircraft engine. Thus, the inventors have accomplished the present invention.

The predetermined projecting part is a projecting part that has a streamline shape extending in the engine shaft direction when seen from the inner side of the diametral direction and is provided with an apex part positioned on the surface (including a rear edge) of the bottom pylon. FIG. 5A is a perspective view illustrating an area around the projecting part according to an embodiment of the present invention, FIG. 5B is a view illustrating the area around the projecting part according to the embodiment seen from the inner side of the diametral direction, and FIG. 6B is a view illustrating a separation area in a flow field in the bypass passage of the engine duct according to the embodiment. The separation area of FIG. 6B is obtained according to the three-dimensional unsteady viscous CFD analysis. Through the drawings, "FF" indicates a front direction (an upstream direction) and "FR" a rear direction (a downstream direction).

A case of forming a projecting part on the outer circumferential wall surface of the core cowl so that the projecting part projects outward in the diametral direction and extends from each circumferentially-oriented side face of the bottom pylon toward the downstream side, a case of forming a projecting part on the inner circumferential wall surface of the nacelle or on the outer circumferential wall surface of the core cowl so that the projecting part projects inward or outward in the diametral direction and extends from each circumferentially-oriented side face of the strut toward the downstream side, or a case of forming a projecting part on the inner circumferential wall surface of the nacelle or on the outer circumferential wall surface of the core cowl so that the projecting part projects inward or outward in the diametral direction and extends from each circumferentially-oriented side face of the fan outlet guide vane toward the downstream side may each be considered similar to the above-mentioned embodiment.

According to a first technical aspect of the present invention, the engine duct is a structural element of an aircraft engine, for taking in air and discharging a core jet and bypass jet and is characterized in that the engine duct includes a cylindrical core cowl (an engine inner cylinder) that internally forms an annular core passage to take in air and discharge the core jet, a cylindrical nacelle (an engine outer cylinder) that is arranged outside the core cowl to surround the core cowl and forms an annular bypass passage between an inner circumferential wall surface thereof and an outer circumferential wall surface of the core cowl, to take in air and discharge the bypass jet, a plurality of struts that are arranged at intervals in a circumferential direction between the outer circumferential wall surface of the core cowl and the inner circumferential wall surface of the nacelle, to support the nacelle with respect to the core cowl, a main pylon that is integrally connected from the core cowl to the nacelle, extends in parallel with an engine shaft direction of the aircraft engine, and projects outward (sideward) in a diametral direction from the nacelle, a sub-pylon that is set between the outer circumferential wall surface of the core cowl and the inner circumferential wall surface of the nacelle in symmetry to the main pylon with respect to an engine shaft center and is positioned between the struts that are adjacent to each other in the circumferential direction, and a plurality of fan outlet guide vanes that are arranged at intervals in the circumferential direction upstream from the struts between the outer circumferential wall surface of the core cowl and the inner circumferential wall surface of the nacelle, to rectify the air taken into the bypass passage into an axial flow. Furthermore to the engine duct, a projecting part is formed on the inner circumferential wall surface of the nacelle or on the outer circumferential wall surface of the core cowl so that the projecting part projects inward or outward in the diametral direction and extends from each circumferentially-oriented side face of at least one of the members including the sub-pylon, struts, and fan outlet guide vanes toward a downstream side, the shape of the projecting part seen from the inner or outer side of the diametral direction being a streamline shape extending in the engine shaft direction, an apex of the projecting part being positioned on the surface of the at least one member.

In the specification and claims, "arranged" means that a member in question is directly arranged on something or indirectly arranged on something through another member, "set" means that a member in question is directly set on something or indirectly set on something through another member, "upstream" means upstream in the flowing direction of a mainstream in the core passage or bypass passage, and "downstream" means downstream in the flowing direction of a mainstream in the core passage or bypass passage.

According to the first aspect, the aircraft engine is started to take air into the core passage, discharge the air as a core jet, take air into the bypass passage, rectify the air into an axial flow, and discharge the same as a bypass jet, thereby generating an engine thrust of the aircraft engine.

In addition to the above effect, the projecting part is formed on the inner circumferential wall surface of the nacelle or on the outer circumferential wall surface of the core cowl so that the projecting part projects inward or outward in the diametral direction and extends from each circumferentially-oriented side face of any one of the members, the shape of the projecting part seen from the inner or outer side of the diametral direction being a streamline shape extending in the engine shaft direction, the apex of the projecting part being positioned on the surface of the any one member. According to the novel knowledge mentioned above or according to the analogy thereof, the first aspect of the present invention is able to sufficiently reduce a separation area in a flow field in the bypass passage during operation of the aircraft engine.

According to a second technical aspect of the present invention, the aircraft engine for discharging a core jet and bypass jet to generate an engine thrust is provided with the engine duct of the first technical aspect.

MODE OF IMPLEMENTING INVENTION

Figure 1:
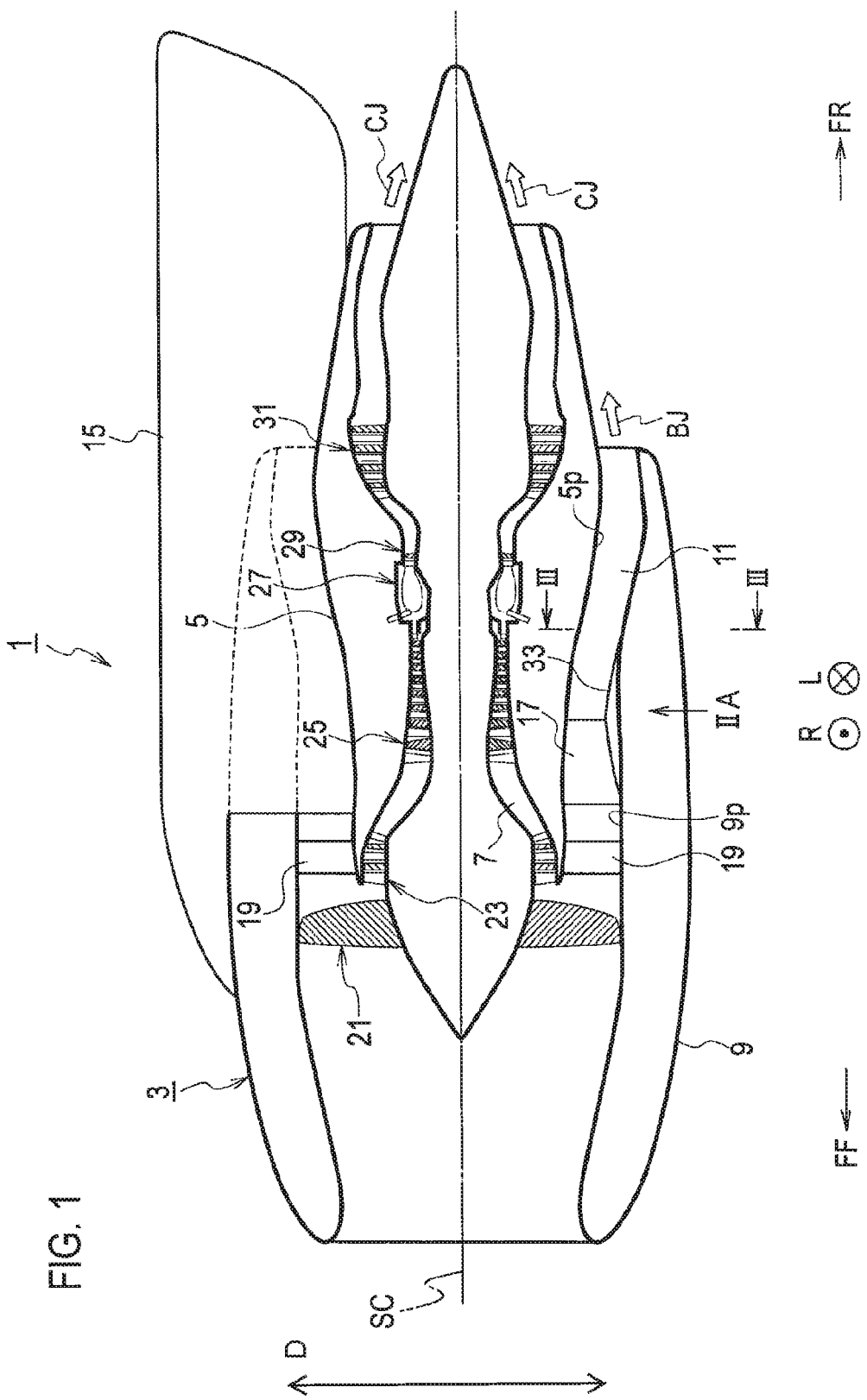
FIG. 1 is a sectional side view illustrating an aircraft engine according to an embodiment of the present invention.

The details of an embodiment of the present invention will be explained with reference to FIGS. 1 to 4. In the drawings, "FF" indicates a front direction (an upstream direction), "FR" a rear direction (a downstream direction), "D" a diametral direction, "L" a left direction, and "R" a right direction.

Figure 2A:
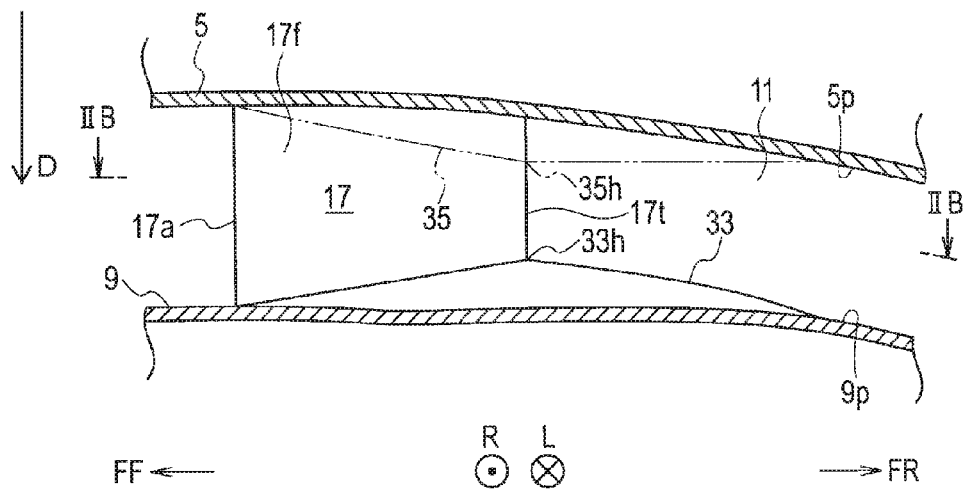
FIG. 2A is an enlarged view seen in the direction of an arrow IIA of FIG. 1
Figure 2B:
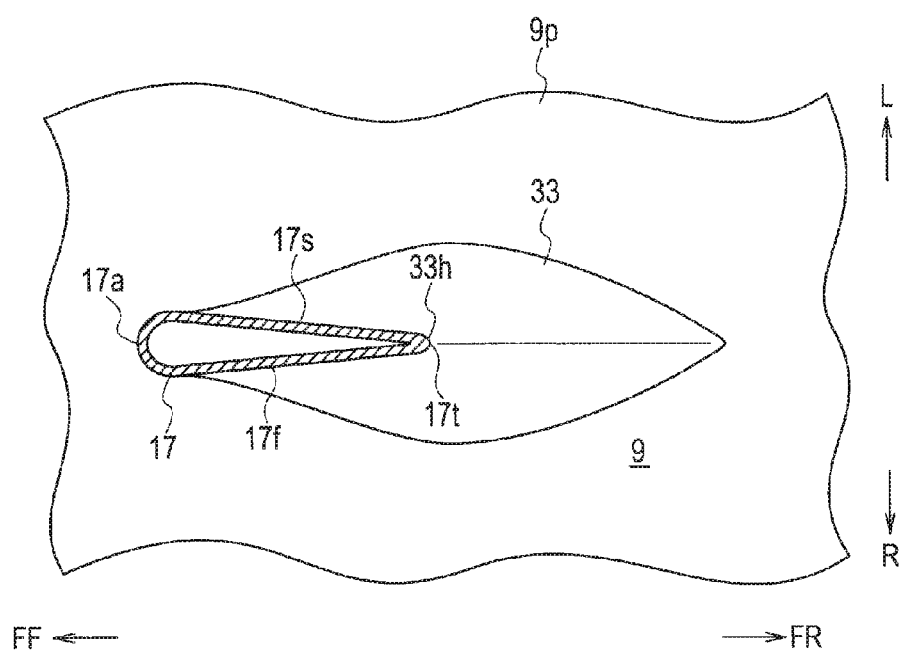
FIG. 2B is a view taken along a line IIB-IIB of FIG. 2A.
Figure 3:
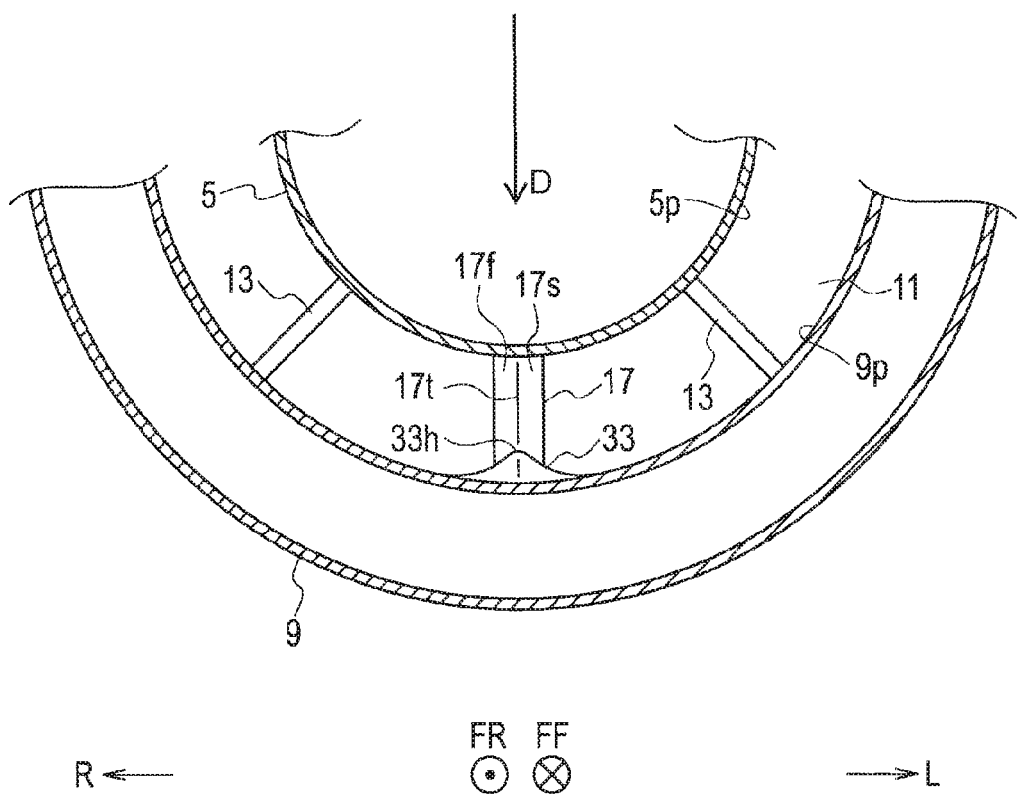
FIG. 3 is an enlarged view taken along a line III-III of FIG. 1.

As illustrated in FIGS. 1 to 3, an aircraft engine 1 according to the embodiment of the present invention is attached to an aircraft (not illustrated) and discharges a core jet CJ and bypass jet BJ to generate an engine thrust. A general constitution of the aircraft engine 1 according to the embodiment of the present invention will be explained.

The aircraft engine 1 has, as an essential structural element, an engine duct 3 to take in air and discharge the core jet CJ and bypass jet BJ. The engine duct 3 has a cylindrical core cowl (engine inner cylinder) 5. Formed inside (on an inner side of) the core cowl 5 is an annular core passage 7 to take in air and discharge the core jet CJ in the rear direction (downstream direction). Set on an outer side of the core cowl 5 is a cylindrical nacelle (an engine outer cylinder) 9 to surround the core cowl 5. Formed between an inner circumferential wall surface 9p of the nacelle 9 and an outer circumferential wall surface (an outer circumferential surface) 5p of the core cowl 5 is an annular bypass passage 11 to take in air and discharge the bypass jet BJ in the rear direction. Further, between the outer circumferential wall surface 5p of the core cowl 5 and the inner circumferential wall surface 9p of the nacelle 9, a plurality of struts 13 are arranged at intervals in a circumferential direction to serve as structural members to support the nacelle 9 with respect to the core cowl 5. A chord direction (a direction connecting a front edge to a rear edge) of each strut 13 is in parallel with an engine shaft direction (a front-rear direction or an engine shaft center SC direction).

Integrally connected from an upper part of the core cowl 5 to an upper part of the nacelle 9 is a top pylon 15 extending in parallel with the engine shaft direction and serving as a main pylon. The top pylon 15 projects from the nacelle 9 in an upper direction (the outer side of a diametral direction) and is used for attachment to the aircraft and for transmission of engine thrust to the aircraft. The top pylon 15 has a function of accommodating piping such as fuel supply piping (not illustrated), lubricant supply piping (not illustrated), cabin bleeding piping (not illustrated), and cooling air bleeding piping (not illustrated).

Set between a lower part (a lower side part) of the outer circumferential wall surface 5p of the core cowl 5 and a lower part (a lower side part) of the inner circumferential wall surface 9p of the nacelle 9 is a bottom pylon 17 serving as a sub-pylon that is symmetrical to the top pylon 15 with respect to the engine shaft center SC (an axial center of the core cowl 5). The bottom pylon 17 is positioned between the struts 13 that are adjacent to each other in a circumferential direction. An axial center direction of the bottom pylon 17 is in parallel with the engine shaft direction. The bottom pylon 17 has a function to serve as a structural member to support the nacelle 9 with respect to the core cowl 5 and a function of accommodating piping such as fuel supply piping (not illustrated).

On an upstream side of the struts 13 between the outer circumferential wall surface 5p of the core cowl 5 and the inner circumferential wall surface 9p of the nacelle 9, a plurality of fan outlet guide vanes 19 are arranged at intervals in the circumferential direction to rectify air taken into the bypass passage 11 into an axial flow.

The constitution of the aircraft engine 1 other than the engine duct 3 will briefly be explained.

As illustrated in FIG. 1, a fan (a fan rotor) 21 is set in front of the core cowl 5, to rotate around the engine shaft center SC to compress and take air into the core passage 7 and bypass passage 11. On the downstream side (rear side) of the fan 21 in the core cowl 5, a low-pressure compressor 23 is set to low-pressure-compress the compressed air (air) compressed and taken into the core passage 7. Further, on the downstream side of the low-pressure compressor 23 in the core cowl 5, a high-pressure compressor 25 is set to high-pressure-compress the low-pressure-compressed air. On the downstream side of the high-pressure compressor 25 in the core cowl 5, a combustor 27 is set to burn fuel in the compressed air.

On the downstream side of the combustor 27 in the core cowl 5, a high-pressure turbine 29 is set. The high-pressure turbine 29 is driven by an expansion of combustion gas from the combustor 27 and is linked to drive the high-pressure compressor 25. On the downstream side of the high-pressure turbine 29 in the core cowl 5, a low-pressure turbine 31 is set. The low-pressure turbine 31 is driven by an expansion of combustion gas and is linked to drive the fan 21 and low-pressure compressor 23.

The fan 21, low-pressure compressor 23, high-pressure compressor 25, high-pressure turbine 29, and low-pressure turbine 31 have pluralities of rotor blades (fan rotor blades, low-pressure-compressor rotor blades, high-pressure-compressor rotor blades, high-pressure-turbine rotor blades, and low-pressure-turbine rotor blades). The low-pressure compressor 23, high-pressure compressor 25, high-pressure turbine 29, and low-pressure turbine 31 have pluralities of stationary blades (low-pressure-compressor stationary blades, high-pressure-compressor stationary blades, high-pressure-turbine stationary blades, and low-pressure-turbine stationary blades). In the drawings, the rotary blades of the fan 21, low-pressure compressor 23, high-pressure compressor 25, high-pressure turbine 29, and low-pressure turbine 31 are hatched.

Characteristic part of the engine duct 3 according to the embodiment of the present invention will be explained.

As illustrated in FIGS. 1 to 3, a projecting part 33 is formed on the inner circumferential wall surface 9p of the nacelle 9 so that the projecting part 33 projects inward in the diametral direction and extends from a front edge 17a of each of circumferentially-oriented side faces 17f and 17s of the bottom pylon 17 toward the downstream side. The projecting part 33 seen from the inner side of the diametral direction has a streamline shape extending in parallel with the engine shaft direction. An apex part 33h at the center of the projecting part 33 is positioned on a rear edge 17t of the bottom pylon 17.

Instead of positioning the apex part 33h of the center of the projecting part 33 on the rear edge 17t of the bottom pylon 17, the apex part 33h may be positioned on either of the circumferentially-oriented side faces 17f and 17s of the bottom pylon 17. It is not always necessary that the projecting part 33 has a left-right symmetrical shape. When seen sideward as illustrated in FIG. 2A, the apex part 33h of the projecting part 33 is linearly connected to the inner circumferential wall surface 9p of the nacelle 9. Instead, the apex part 33h may be connected to the inner circumferential wall surface 9p in streamline.

Another projecting part 35 may be formed on the outer circumferential wall surface 5p of the core cowl 5 so that the projecting part 35 projects outward in the diametral direction and extends from the front edge 17a of each of the circumferentially-oriented side faces 17f and 17s of the bottom pylon 17 toward the downstream side. In this case, the shape of the projecting part 35 seen from the outer side of the diametral direction is a streamline shape extending in parallel with the engine shaft direction. An apex 35h at the center of this projecting part 35 is positioned on the surface (including the rear edge 17t) of the bottom pylon 17.

The operation and effect of the embodiment of the present invention will be explained. A proper starter device (not illustrated) is operated to drive the high-pressure compressor 25. The combustor 27 burns fuel in compressed air so that an expansion of combustion gas drives the high-pressure turbine 29 and low-pressure turbine 31. Further, the high-pressure turbine 29 is interlinked to drive the high-pressure compressor 25 and the low-pressure turbine 31 is interlinked to drive the fan 21 and low-pressure compressor 23.

A series of the above-mentioned operations including the driving of the fan 21, the driving of the low-pressure compressor 23, the driving of the high-pressure compressor 25, the combustion by the combustor 27, the driving of the high-pressure turbine 29, and the driving of the low-pressure turbine 31 continues. As a result, the aircraft engine 1 is properly driven and the core passage 7 and bypass passage 11 discharge the core jet CJ and bypass jet BJ, respectively, thereby generating an engine thrust of the aircraft engine 1.

In addition to the above-mentioned general operation of the aircraft engine 1, the projecting part 33 is formed on the inner circumferential wall surface of the nacelle 9 so that the projecting part 33 projects inward in the diametral direction and extends from the front edge 17a of each of the circumferentially-oriented side faces 17f and 17s of the bottom pylon 17 toward the downstream side. The projecting part 33 seen from the inner side of the diametral direction has a streamline shape extending in parallel with the engine shaft direction. The apex part 33h at the center of the projecting part 33 is positioned on the rear edge 17t of the bottom pylon 17. According to the novel knowledge mentioned above, this structure is able to sufficiently reduce a separation area to be created in a flow field in the bypass passage 11 during operation of the aircraft engine 1. In particular, if another projecting part 35 is formed on the outer circumferential wall surface 5p of the core cowl 5 so that the projecting part 35 projects outward in the diametral direction and extends from the front edge 17a of each of the circumferentially-oriented side faces 17f and 17s of the bottom pylon 17 toward the downstream side, the separation area in the flow field in the bypass passage 11 will more sufficiently be reduced.

Figure 4:
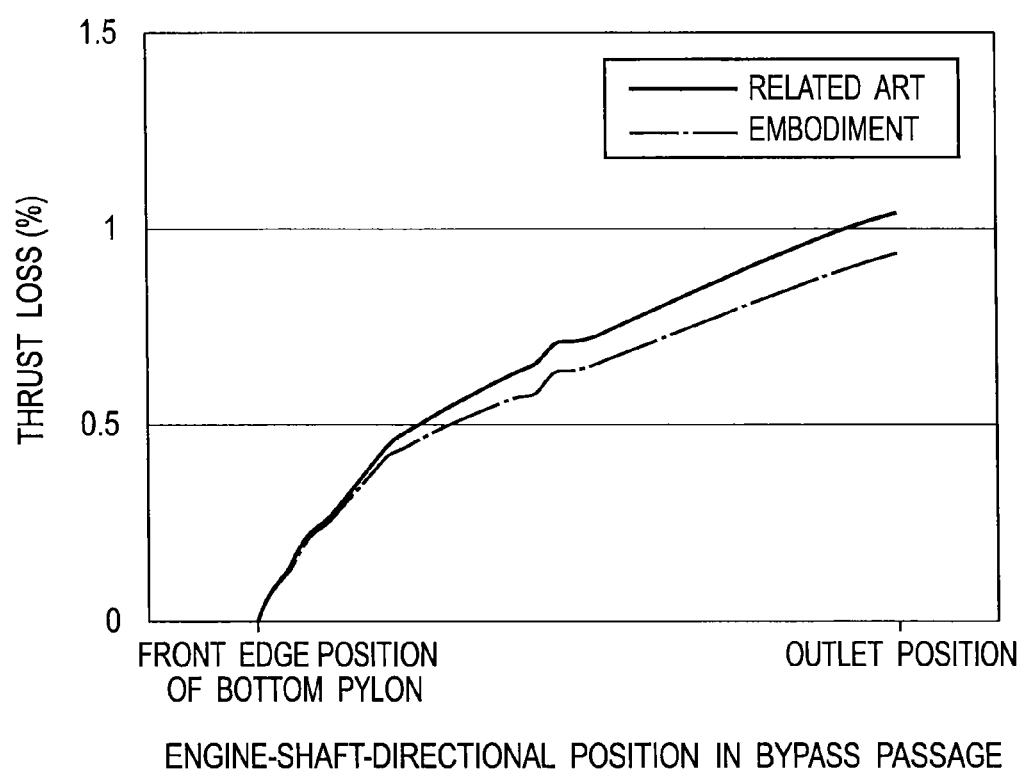
FIG. 4 is a view illustrating a relationship between an engine-shaft-directional position in a bypass passage of an engine duct and a thrust loss according to the embodiment and that according to a comparative example.
Figure 5A:
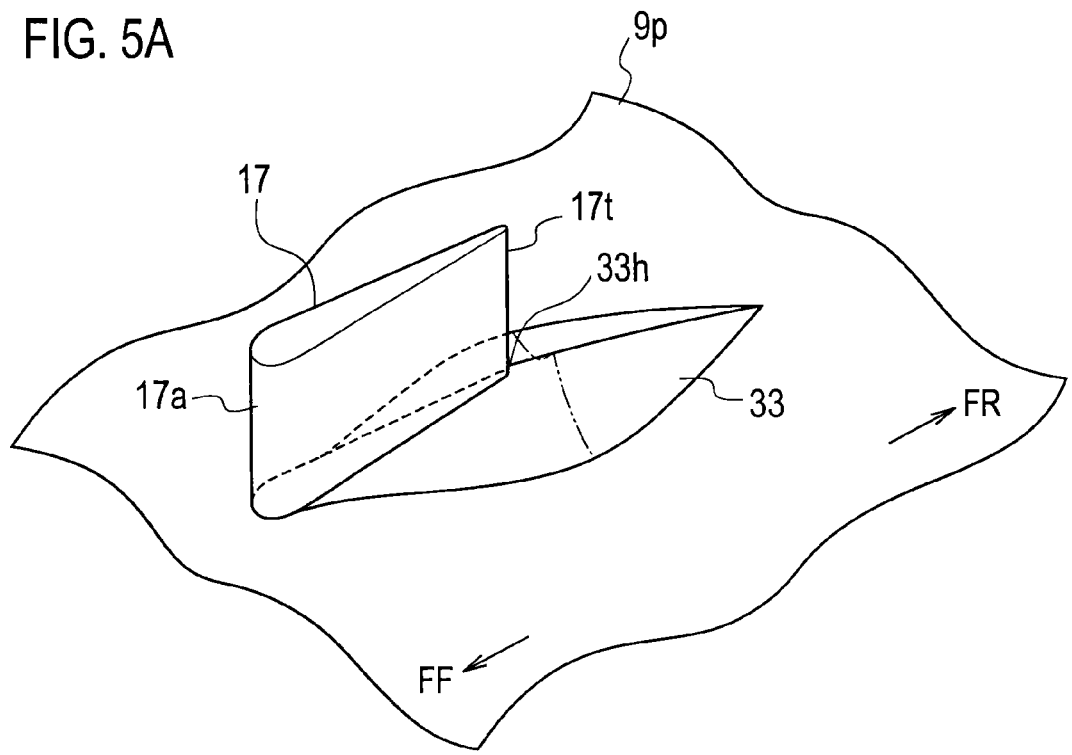
FIG. 5A is a perspective view illustrating an area around a projecting part according to the embodiment and FIG. 5B is a view illustrating the projecting part according to the embodiment seen from the inner side of a diametrical direction.
Figure 5B:
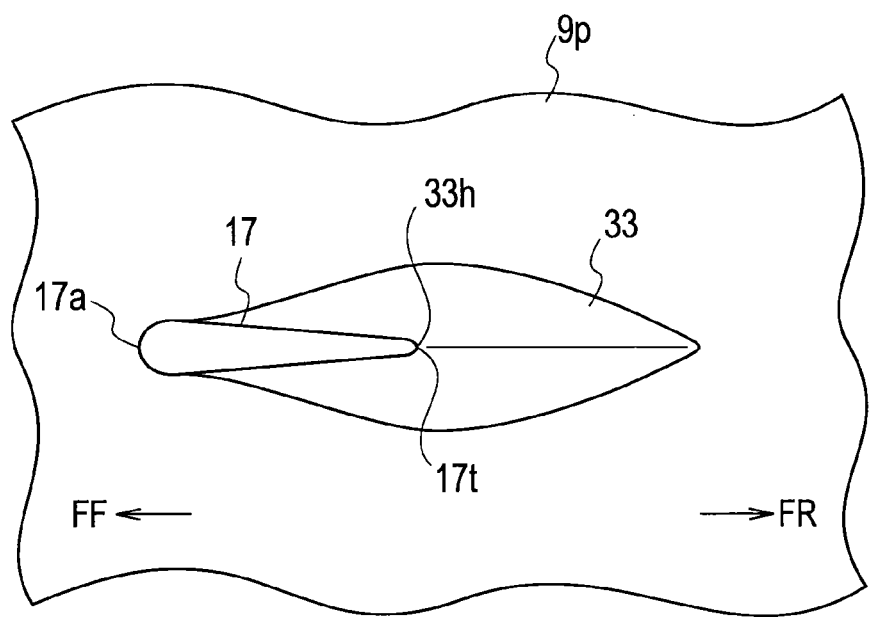
Figure 6A:
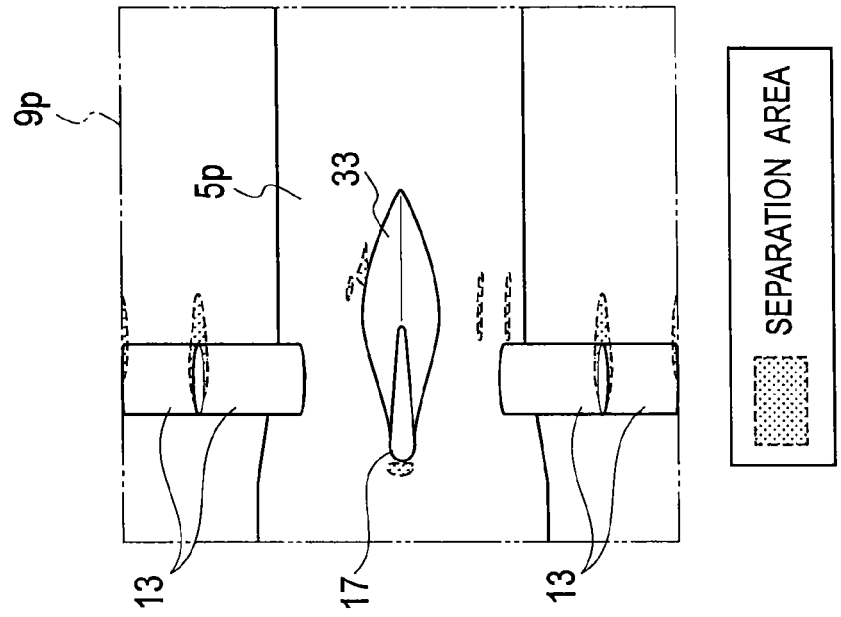
FIG. 6A is a view illustrating a separation area in a flow field in the bypass passage of the engine duct according to the related art and FIG. 6B is a view illustrating a separation area in a flow field in the bypass passage of the engine duct according to the embodiment.
Figure 6B:
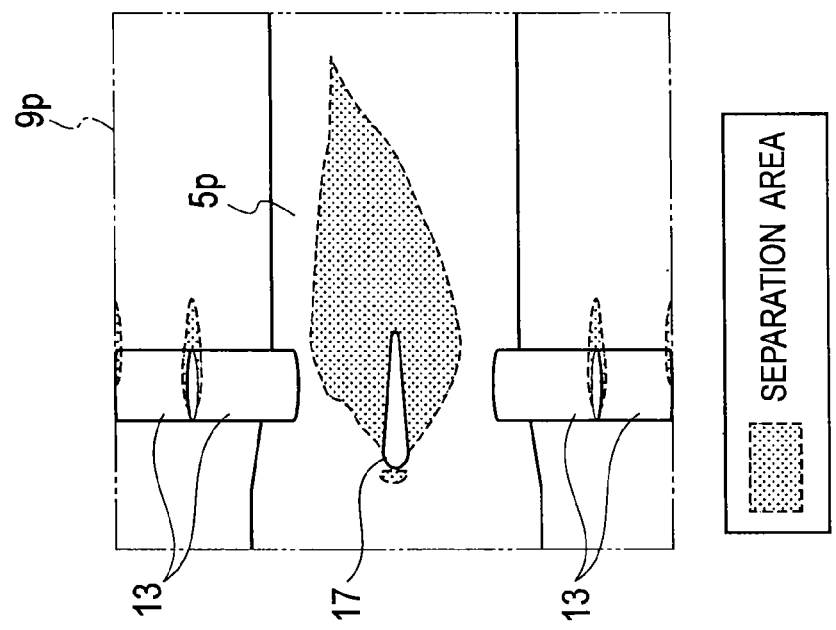

According to the embodiment of the present invention, a separation area to be created in a flow field in the bypass passage 11 can sufficiently be reduced during operation of the aircraft engine 1. This results in decreasing a thrust loss in the bypass passage 11 and improving the engine performance of the aircraft engine 1 to higher levels. In particular, as illustrated in FIG. 4, a relationship between an engine-shaft-directional position in a bypass passage and a thrust loss obtained from a three-dimensional unsteady viscous CFD analysis confirms that, compared with an engine duct according to a related art, the engine duct according to the embodiment (the engine duct 3 according to the embodiment) is able to more sufficiently reduce a thrust loss at an outlet position of the bypass passage. In the three-dimensional unsteady viscous CFD analysis, a thrust loss at a front edge position of the bottom pylon in the bypass passage of the engine duct of the embodiment and that of the related are each set to zero.

The present invention is not limited to the above-mentioned embodiment but is able to be embodied in various forms as mentioned below.

A strut-side projecting part (not illustrated) may be formed on the inner circumferential wall surface 9p of the nacelle 9 or on the outer circumferential wall surface 5p of the core cowl 5 so that the strut-side projecting part projects inward or outward in the diametral direction and extends from each circumferentially-oriented side face of each strut 13 toward the downstream side. In this case, the shape of each strut-side projecting part seen from the inner or outer side of the diametral direction is a streamline shape extending in the engine shaft direction. An apex part of each strut-side projecting part is positioned on the surface (including a rear edge) of the strut.

A guide-vane-side projecting part (not illustrated) may be formed on the inner circumferential wall surface 9p of the nacelle 9 or on the outer circumferential wall surface 5p of the core cowl 5 so that the guide-vane-side projecting part projects inward or outward in the diametral direction and extends from each circumferentially-oriented side face of each fan outlet guide vane 19 toward the downstream side. In this case, the shape of each guide-vane-side projecting part seen from the inner or outer side of the diametral direction is a streamline shape extending in the engine shaft direction. An apex part of each guide-vane-side projecting part is positioned on the surface (including a rear edge) of the fan outlet guide vane.

Instead of integrally connecting the top pylon 15 from the upper part of the core cowl 5 to the upper part of the nacelle 9, a main side-pylon (not illustrated) serving as a main pylon may integrally be connected from a left part (or a right part) of the core cowl 5 to a left part (or a right part) of the nacelle 9. In this case, instead of setting the bottom pylon 17 between the lower part of the outer circumferential wall surface 5p of the core cowl 5 and the lower part of the inner circumferential wall surface 9p of the nacelle 9, a sub-side-pylon (not illustrated) serving as a sub-pylon is set between a right part (or a left part) of the outer circumferential wall surface 5p of the core cowl 5 and a right part (or a left part) of the inner circumferential wall surface 9p of the nacelle 9 in symmetry to the main side-pylon with respect to the engine shaft center SC.

The scope of rights of the present invention is not limited by these embodiments.

The present invention is capable of sufficiently reducing a separation area in a flow field in the bypass passage during operation of the aircraft engine, and therefore, is capable of decreasing a thrust loss in the bypass passage and improving the engine performance of the aircraft engine to higher levels.

The invention claimed is:

1. An engine duct serving as a structural element of an aircraft engine, for taking in air and discharging a core jet and bypass jet, comprising: a cylindrical core cowl having an annular core passage for taking air therein and discharging the core jet;

a cylindrical nacelle arranged outside the core cowl for surrounding the core cowl and having an annular bypass passage between an inner circumferential wall surface thereof and an outer circumferential wall surface of the core cowl for taking air therein and discharging the bypass jet;

struts arranged at intervals in a circumferential direction between the outer circumferential wall surface of the core cowl and the inner circumferential wall surface of the nacelle and supporting the nacelle with respect to the core cowl;

a main pylon integrally connected from the core cowl to the nacelle, extending in parallel with an engine shaft direction of the aircraft engine, and projecting outward in a diametral direction from the nacelle;

a sub-pylon being set between the outer circumferential wall surface of the core cowl and the inner circumferential wall surface of the nacelle in symmetry to the main pylon with respect to an engine shaft center and positioned between the struts that are adjacent to each other in the circumferential direction; and a plurality of fan outlet guide vanes arranged at intervals in the circumferential direction upstream from the struts between the outer circumferential wall surface of the core cowl and the inner circumferential wall surface of the nacelle and rectifying the air taken into the bypass passage into an axial flow, wherein:

a projecting part is formed on the inner circumferential wall surface of the nacelle or on the outer circumferential wall surface of the core cowl so that the projecting part projects inward or outward in the diametral direction and extends from each circumferentially-oriented side face of at least one of member including the sub-pylon, struts, and fan outlet guide vanes toward a downstream side; and a shape of the projecting part seen along the diametral direction is a streamline shape extending in the engine shaft direction and an apex of the projecting part, is positioned on a trailing edge of the at least one member.

2. An aircraft engine for generating an engine thrust by discharging a core jet and bypass jet, comprising the engine duct according to claim 1.

3. The engine duct according to claim 1, wherein the projecting part extends from a leading edge of each circumferentially-oriented side face of the at least one member toward the downstream side.

4. The engine duct according to claim 1, wherein the least one member is the sub-pylon.

* * * * *